(12) United States Patent  
Ree et al.

(10) Patent No.: US 9,019,864 B2  
(45) Date of Patent: Apr. 28, 2015

(54) SYSTEM AND METHOD OF WIRELESS ENABLED DEVICE CONFIGURATION OVER AN ADVANCED METERING INFRASTRUCTURE (AMI)

(75) Inventors: Bradley Richard Ree, Cumming, GA (US); Ryan Marc LaFrance, Marietta, GA (US)

(73) Assignee: General Electric Company, Schenectady, NY (US)

( * ) Notice: Subject to any disclaimer, the term of this patent is extended or adjusted under 35 U.S.C. 154(b) by 632 days.

(21) Appl. No.: 13/026,825

(22) Filed: Feb. 14, 2011

(65) Prior Publication Data

US 2012/0207056 A1  Aug. 16, 2012

(51) Int. Cl.
*H04L 12/28* (2006.01)
*G06F 15/177* (2006.01)
*H04Q 9/00* (2006.01)
*H04W 8/24* (2009.01)
*H04W 48/20* (2009.01)

(52) U.S. Cl.
CPC ............ *H04W 8/245* (2013.01); *H04Q 9/00* (2013.01); *H04Q 2209/43* (2013.01); *H04Q 2209/60* (2013.01); *H04W 48/20* (2013.01)

(58) Field of Classification Search
None
See application file for complete search history.

(56) References Cited

U.S. PATENT DOCUMENTS

| | | | | |
|---|---|---|---|---|
| 8,325,060 | B2 * | 12/2012 | Flammer, III | 340/870.11 |
| 8,374,127 | B2 * | 2/2013 | Woo et al. | 370/328 |
| 2003/0076809 | A1 * | 4/2003 | Basil et al. | 370/346 |
| 2003/0167105 | A1 * | 9/2003 | Colborn | 700/295 |
| 2007/0271398 | A1 * | 11/2007 | Manchester et al. | 709/249 |
| 2009/0222828 | A1 * | 9/2009 | LeFevre et al. | 718/102 |
| 2009/0322556 | A1 * | 12/2009 | Cook et al. | 340/870.02 |
| 2010/0138363 | A1 * | 6/2010 | Batterberry et al. | 705/412 |
| 2010/0217452 | A1 * | 8/2010 | McCord et al. | 700/295 |
| 2010/0250015 | A1 * | 9/2010 | Flikkema | 700/295 |
| 2010/0293250 | A1 * | 11/2010 | Ankaiah et al. | 709/219 |
| 2010/0321574 | A1 * | 12/2010 | Kerofsky | 348/563 |
| 2011/0035510 | A1 * | 2/2011 | Alexander | 709/246 |
| 2011/0137826 | A1 * | 6/2011 | West et al. | 705/412 |

(Continued)

FOREIGN PATENT DOCUMENTS

| | | |
|---|---|---|
| EP | 2096416 A1 | 9/2009 |
| WO | 2004003772 A1 | 1/2004 |
| WO | 2009029157 A1 | 3/2009 |

OTHER PUBLICATIONS

European Search Report with Application No. EP12155223 completed Sep. 5, 2013.

*Primary Examiner* — Marsha D Banks Harold  
*Assistant Examiner* — Christopher Wyllie  
(74) *Attorney, Agent, or Firm* — Sutherland Asbill & Brennan LLP (57) ABSTRACT

Described herein are embodiments of methods and systems for configuring a wireless-enabled device over an advanced metering infrastructure (AMI) network. In accordance with one aspect, a method is provided comprising receiving, from a first device via a first network, information about one or more wireless access points accessible by the first device. The method further comprises receiving, from a second device via a second network, configuration information for the first device for configuring the first device to connect to a wireless network through one of the one or more wireless access points; and configuring the first device using the configuration information. In one aspect, configuring the first device includes sending at least a portion of the configuration information to the first device via the first network.

35 Claims, 6 Drawing Sheets

(56) References Cited

U.S. PATENT DOCUMENTS

| | | | |
|---|---|---|---|
| 2011/0305196 A1* | 12/2011 | Kurokawa et al. | 370/328 |
| 2011/0307932 A1* | 12/2011 | Fan et al. | 725/110 |
| 2012/0029714 A1* | 2/2012 | Brian et al. | 700/291 |
| 2012/0131324 A1* | 5/2012 | Ansari et al. | 713/100 |
| 2012/0201145 A1* | 8/2012 | Ree et al. | 370/245 |
| 2012/0207056 A1* | 8/2012 | Ree et al. | 370/254 |
| 2012/0207179 A1* | 8/2012 | Ree | 370/465 |
| 2012/0218120 A1* | 8/2012 | Ree et al. | 340/870.02 |
| 2013/0121384 A1* | 5/2013 | Prince et al. | 375/219 |

\* cited by examiner

SYSTEM AND METHOD OF WIRELESS ENABLED DEVICE CONFIGURATION OVER AN ADVANCED METERING INFRASTRUCTURE (AMI)

BACKGROUND OF THE INVENTION

Wi-Fi™, a trademark of the Wi-Fi Alliance (Austin, Tex.), is a term used to describe only a narrow range of connectivity technologies including wireless local area networks (WLANs) based on the IEEE 802.11 standards, device to device connectivity (such as Wi-Fi Peer to Peer, which is also known as Wi-Fi Direct), and a range of technologies that support PAN, LAN and even WAN connections.

A Wi-Fi™ enabled device such as a personal computer, video game console, smartphone, digital audio player, smart meter, electric or hybrid electric vehicle (EV) charging station and the like can connect to the Internet when within range of a wireless network connected to the Internet. The coverage of one or more (interconnected) access points—called hotspots—can comprise an area as small as a few rooms or as large as many square miles. Coverage in the larger area may depend on a group of access points with overlapping coverage. Routers that incorporate a digital subscriber line modem or a cable modem and a Wi-Fi™ access point, often set up in homes and other premises, can provide Internet access and internetworking to all devices connected (wirelessly or by cable) to them. Portable Wi-Fi™ routers also allow people to easily create their own Wi-Fi™ hotspots that connect to Internet via cellular networks. Now many mobile phones can also create wireless connections via tethering. Wi-Fi™ also connects places that would traditionally not have network access, for example bathrooms, kitchens and garden sheds.

The increasing demand for energy and the use of finite resources for energy production have led to the use of increased technology for the production, transmission, distribution and consumption of energy in order to make, distribute and use energy more efficiently and wisely. To that end, utility service providers have begun employing information technology systems integrated with their energy production, transmission, distribution and metering systems to enable more efficient monitoring and operation of such systems. Concurrently, vendors and manufacturers have also begun employing similar technology in products and devices that consume electricity, such as appliances (e.g., refrigerators, washing machines and dryers, dishwashers, HVAC systems, lighting systems, stoves, water heaters, etc.) and electronics (e.g., televisions, stereos, computers, etc.). These efforts are often broadly categorized as smart grid, smart meter and smart appliance technologies.

The smart grid marries information technology with the current electrical infrastructure. The smart grid is, in essence, an "energy Internet," delivering real-time energy information and knowledge—empowering smarter energy choices. Roles for the smart grid include enabling the integration and optimization of more renewable energy (such as wind and solar); driving significant increases in the efficiency of the electrical network; and, empowering consumers to manage their energy usage and save money without compromising their lifestyle.

Smart grid technologies provide utilities and consumers with real-time knowledge and decision-making tools that empower them to save energy, resources, money, and the environment. The smart grid is not a singular product, but rather a collection of hardware and software that works together to make today's electrical grid more intelligent. Similar to how the Internet turned a disaggregated collection of computers into a more powerful tool, overlaying the current power infrastructure with smart grid technology is like connecting the Internet to the computer, making an already useful machine much better and providing people with information to make intelligent decisions. Similarly, the smart grid, or the "energy Internet," empowers consumers, businesses and utilities to make smarter energy choices.

Smart grid components include automation software and intelligent electronic hardware systems that control the transmission and distribution grids. Smart grid automation technologies—such as energy management systems and distribution management systems—help provide real-time knowledge and control over the distribution and transmission grids. On the transmission side, Energy Management Systems (EMS) provide real-time information on the grid's status, helping utilities automate various grid functionalities remotely. This automation technology helps utilities choose the best, most affordable generation mix (known as economic dispatch), keeping costs lower for consumers and businesses; reduce losses and waste in the delivery of power to drive a more efficient system; and maintain system reliability to help ensure a steady supply of power to customers. A Distribution Management System (DMS) comprises the smart grid automation technology that provides utilities with real-time information about the distribution network and allows utilities to remotely control switches in the grid. The DMS is the heart of a smarter distribution grid, enabling utilities to manage distributed renewable generation, support grid efficiency technologies, and control the isolation and restoration of outages. Without DMS, the utility gets very little real-time information about the distribution grid and can't realize many of the benefits of a smarter grid.

Furthermore, smart grid technologies can extend beyond the electrical grid. With smart grid technologies in the home—like smart meters, smart energy panels, and smart appliances—consumers can have access to more accurate data and knowledge about electricity pricing, helping them save money and lower their environmental footprint.

Currently, most power companies offer one set price for electricity throughout the day, regardless of how expensive it is to produce. Most consumers don't know that it costs much more to produce energy during the peak hours of the day—typically between 2 p.m. and 7 p.m.—than it does at any other time. A smart meter can communicate time of use pricing via smart home energy panels or other display devices to help consumers make smarter energy choices throughout the day. Consumers will be more likely to use high-consuming devices during off-peak pricing periods, when electricity prices are cheaper. With smart meters, buying electricity is like buying other consumer goods—with price impacting a purchase decision. For example, a consumer can choose to have his or her house pre-cooled before arriving home to ensure the air conditioning system can remain off during expensive peak pricing hours, without impacting the consumer's comfort level. A consumer can also have his or her water pre-heated to avoid peak prices and lower his or her energy bill. A year-long study by the U.S. Department of Energy showed that real-time pricing information provided by the smart meter helped consumers reduce their electricity costs 10% on average and their peak consumption by 15%.

Smart meters can also enable consumers to pre-pay their electricity bills and help utilities better detect and manage outages. Smart meters coupled with advanced metering infrastructure (AMI) helps pinpoint problems on the grid, allowing utilities to determine exactly which customers are without power. Compare this to today, when many utilities still wait for customer calls to notify them of outages.

Smart appliances can work in concert with smart meters and the smart grid to avoid peak-hour energy use and top-tier pricing without any negative impact on the consumer by adapting to price signals from the utility. For example, a dryer may automatically switch from high heat to "fluff" if electricity hits a certain per-kilowatt-hour rate—even if the homeowner is at work. Or, the automatic defrost on a refrigerator can delay itself until a time of reduced electricity rates. If the freezer delays the defrost cycle until after peak energy hours, consumers pay less for the same amount of energy. There are countless ways to conserve energy and save money when smart appliances are coupled with smart meters and time-of-use pricing information including, for example, updating software or firmware of smart appliances using the smart grid and smart meter infrastructure. The smart grid, smart meter and smart appliance technologies enable utilities to communicate (duplex) with smart appliances in the home. This ability creates opportunities beyond that of energy management.

Currently, many different communication standards are competing for connectivity from the meter to the homeowner's appliances. Wi-Fi™ is one viable solution. A Wi-Fi™ enabled meter has the challenge of configuring the meter to join an existing, secure access point in the home. Furthermore, in some instances electric vehicle (EV) charging stations are Wi-Fi™ enabled. However, a Wi-Fi™ meter or charging station, as with any Wi-Fi™ enabled device, is required to be configured to join a network. Typically, the proper service set identifier (SSID) number must be selected when more than one access point is present. Also, a password is required to join a protected network. Once on the network, the IP address of the device must be known if the homeowner wishes to use his or her computer to communicate with the device.

Generally, configuring a Wi-Fi™ enabled device involves a user entering network information directly into the device through buttons and a display, or the device to be configured is connected to a computer through a serial or USB cable, and then the information is sent to the device from the computer. Once on the network, either a display on the device would show the IP address, or a custom program to locate the device would use special messages. However, these methods are generally not possible for some devices such as a Wi-Fi™ enabled meter or electric vehicle (EV) charging device as such devices may lack the input/output interface required for configuration. Further, the Wi-Fi™ enabled device may not have the ability to connect with a computer through a cable, or if it does then a homeowner may not be allowed access to perform the connection.

Therefore, what is desired is a method and system that overcomes challenges in the art, some of which are described above, to configure a Wi-Fi™ enabled device over an AMI.

BRIEF DESCRIPTION OF THE INVENTION

Described herein are embodiments of methods and systems for configuring a wireless-enabled device over an advanced metering infrastructure (AMI) network.

In accordance with one aspect, a method is provided comprising receiving, from a first device via a first network, information about one or more wireless access points accessible by the first device. The method further comprises receiving, from a second device via a second network, configuration information for the first device for configuring the first device to connect to a wireless network through one of the one or more wireless access points; and configuring the first device using the configuration information. In one aspect, configuring the first device includes sending at least a portion of the configuration information to the first device via the first network.

In accordance with another aspect, a system is described. The system is comprised of a memory and a processor operably connected with the memory. The processor is configured to receive, from a first device via a first network, information about one or more wireless access points accessible by the first device; receive, from a second device via a second network, configuration information for the first device for configuring the first device to connect to a wireless network through one of the one or more wireless access points; and configure the first device using the configuration information. In one aspect, configuring the first device includes sending at least a portion of the configuration information to the first device via the first network.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein. It is understood that when combinations, subsets, interactions, groups, etc. of these components are disclosed specific reference to each various individual and collective combination and permutation may not be explicitly disclosed, each is specifically contemplated and described herein, for all methods and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and examples included therein, and to the Figures and their previous and following description.

Smart appliances are appliances that can be programmed to operate when it is most cost effective to do so based on time-of-use pricing signals from the utility. For example, a smart refrigerator would only enable the defrost cycle to occur when electricity prices are lowest, without compromising a consumer's lifestyle. Smart meters are among the fundamental building blocks of smart grid deployments. Generally, smart meters have capabilities beyond common meters such as communications back to a headend (e.g., a utility) and/or communications with devices in the metered location such as computers, appliances, entertainment devices, water heaters and HVAC, and the like. Such communication can be wired or wireless. Further, smart meters generally comprise an intelligence aspect provided by processing capabilities within the meter through the use of processors, microprocessors or other intelligence devices such as field-programmable gate arrays (FPGAs). Therefore, as used herein, "smart" refers to a meter's ability to communicate with the utility and/or devices within the metered location and processing capability at the meter. They track and report energy usage by time of day, enabling utilities to charge less for electricity used during off-peak hours. As a result, consumers can choose to shift energy-intensive activities to times when rates are lower to save on energy costs. In general, smart appliances can be configured to communicate with a smart meter and smart meters are configured to communicate with the smart grid. Previously, these communication capabilities were used to transfer time of use information and appliance control signals among and between the utility and the smart appliance. However, as described herein, these communication capabilities can be used for additional purposes, including for example updating smart appliance software or firmware using the smart grid and smart meter infrastructure.

Electric vehicle charging stations (EVCS) are stations for charging electric vehicles (EVs). In some instances, they can be sub-metered, or may be directly metered. As with many smart devices and smart meters, EVCS can come equipped with wireless radios that can be configured to access (and make accessible) the EVCS over a wireless network. However, before such implementations can be carried out, the devices (smart meters, EVCS, and the like) must be configured to communicate with devices that comprise a wireless network, such as a home Wi-Fi™ network.

Figure 1:
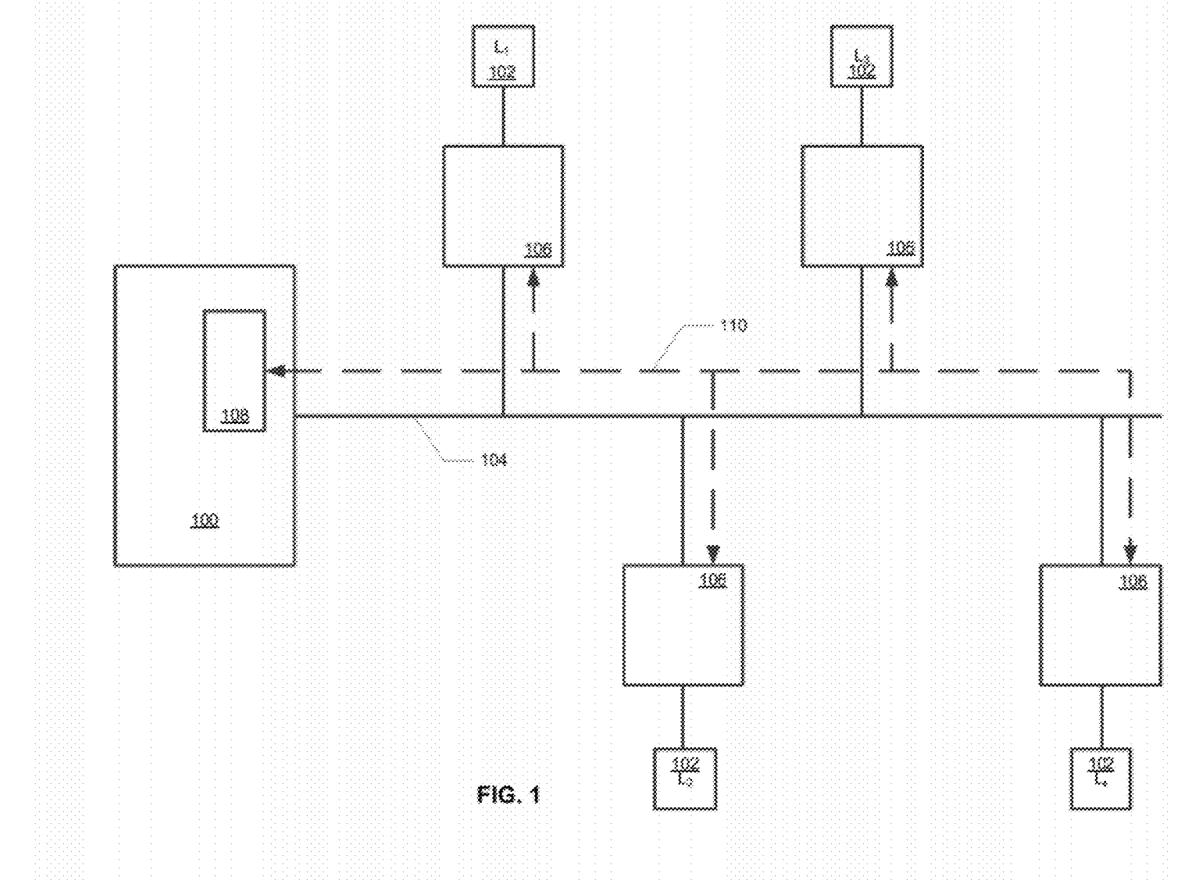
FIG. 1 is a block diagram of a section of an exemplary utility distribution system.

Referring to FIG. 1, an illustration of one type of system that would benefit from embodiments of the present invention is provided. FIG. 1 is a block diagram of a section of an exemplary utility distribution system such as, for example, an electric distribution system. As shown in FIG. 1, a utility service is delivered by a utility provider 100 to various loads $L_1$-$L_n$ 102 through a distribution system 104. In one aspect, the utility service provided is electric power. In one aspect, consumption of the utility service by the loads 102 is measured at the load locations by devices 106 such as meters. If the device 106 is an electric meter, the meter can be a single-phase or poly-phase electric meter, as known to one of ordinary skill in the art, depending upon the load 102. In one aspect, the electric meter is a smart meter as described herein and as known to one of ordinary skill in the art. Hereinafter, the specification will refer to the meter as a "meter," "electric meter," and/or "smart meter," where the terms can be used interchangeably. One non-limiting example of a smart meter is the GE I210+c meter as available from General Electric Company (Schenectady, N.Y.). In one aspect, the device 106 can be an electric vehicle charging station (EVCS) used to replenish the charge for an electric vehicle or hybrid electric vehicle (as both electric vehicles and hybrid electric vehicles may require charging to replenish their batteries, they will both be referred to herein as "electric vehicles" or "EVs"); therefore the load 102 can be the EV. In one aspect, the device 106 is configured to communicate via a network with the loads 102. In one aspect, the loads 102 can be smart appliances, as described herein and as known to one of ordinary skill in the art. Smart appliances are available from vendors or manufacturers such as, for example, General Electric Company, Whirlpool Corporation (Benton Harbor, Mich.), LG Electronics USA (Englewood Cliffs, N.J.), among others. While consumption information is used by the utility provider 100 primarily for billing the consumer, it also can be used for other purposes including planning and profiling the utility distribution system. In some instances, utility providers 100 desire to electronically communicate with the devices 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the devices 106 can be configured to communicate with one or more computing devices 108 through a first communications network 110, which can be wired, wireless or a combination of wired and wireless, as known to one of ordinary skill in the art. In one aspect, the first communications network 110 can comprise at least part of a smart grid network. Therefore, it is desired that the devices 106 and system such as that shown in FIG. 1 are configured to have capabilities beyond that of mere delivery and measurement of utility services.

Devices 106 such as smart meters and EVCS can be equipped with wireless radios for communicating with "smart" loads 102 and devices through a WLAN within range of the radios such as personal computers and other wireless-enabled devices. However, these smart devices need to be configured in order to be able to join a WLAN and to be wirelessly accessed by devices that comprise the WLAN.

Described herein are embodiments of methods and systems to communicate through a first network with a smart meter or an EVCS to configure it to be accessible by devices through a second network. In particular, a smart meter or EVCS can be configured using an advanced metering infrastructure (AMI) network to be accessible by devices through a WLAN that encompasses the smart meter or EVCS. In general, the technical effect of embodiments of the present invention provides an improvement over current methods and systems of configuring a smart meter or EVCS to join a WLAN.

Figure 2:
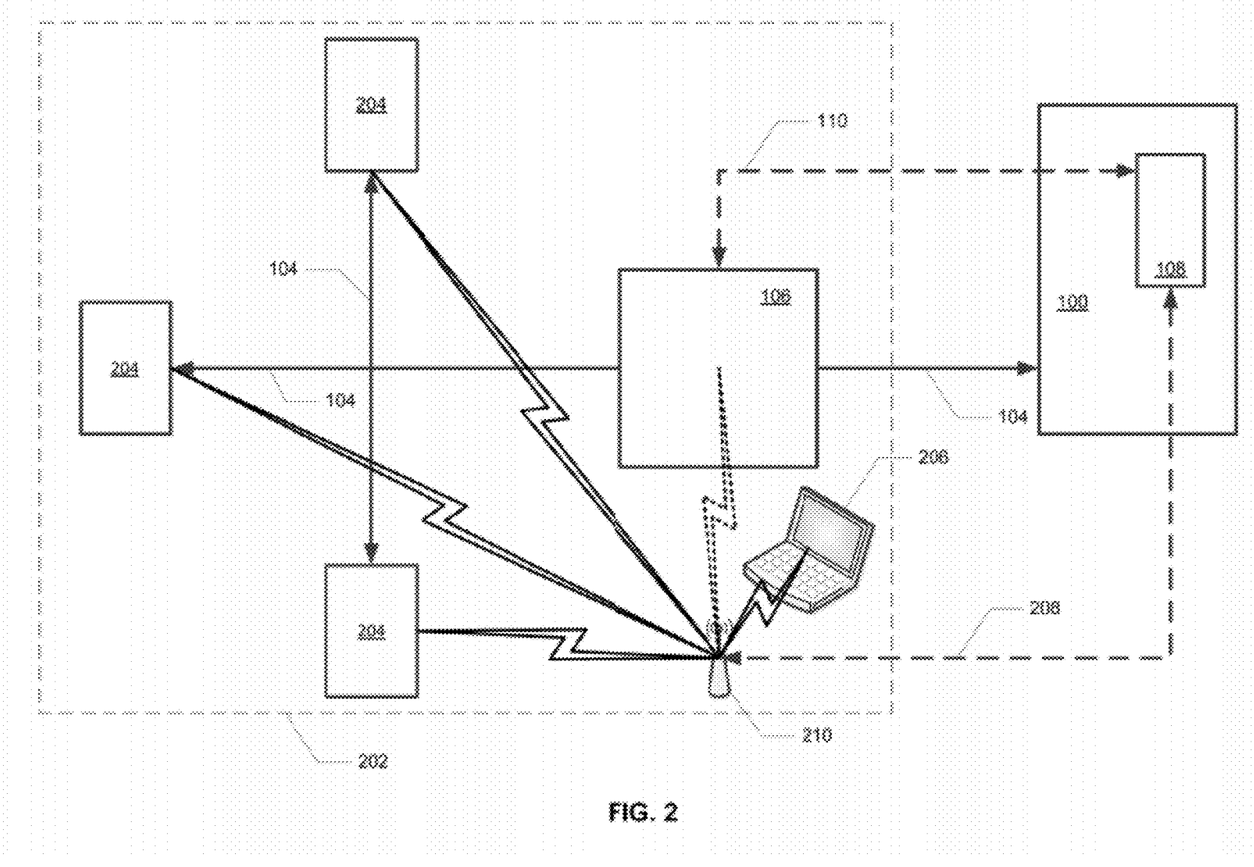
FIG. 2 is an exemplary illustration of a device configured to communicate with one or more appliances or smart devices over a wireless local area network (WLAN) and configured to communicate with a computing device over a first network.

FIG. 2 is an exemplary illustration of a device configured to communicate with one or more appliances or smart devices over a wireless local area network (WLAN) and configured to communicate with a computing device over a first network. The computing device 108 is configured to communicate with the device 106 over the first network 110, and is configured to communicate with at least one second device 206 over a second network 208 such as the Internet. In one aspect, it is desired to configure the device 106 to communicate with at least one or more smart devices 204 via a wireless network 202 such as a WLAN. In one aspect, access to the second network 208 by the one or more devices 204 can be through the wireless network 202 such as a WLAN by way of an access point 210. In one aspect, and as non-limiting examples, the one or more devices 204 can comprise smart appliances as described herein and as known to one of ordinary skill in the art such as a computer, television, stereo, home security system, and the like. As shown in FIG. 2, a wireless network 202 can be used to communicate between one or more smart devices 204 and/or a device 106 such as a smart meter or EVCS. In one aspect, the one or more smart devices 204 comprise at least a portion of a load 102, and can form a wireless network 202 that communicates with the device 106. However, the device 106 is required to be configured to participate in the wireless network 202.

Therefore, in one aspect, the computing device 108 receives, from the device 106 via a first network 110, information about one or more wireless access points 210 accessible by the smart device 204. In other words, the device 106 detects the presence of any available wireless networks 202 and their associated access points 210 and provides that information to the computing device 108 via the first network 110. In one aspect, the first network 110 is an advanced metering infrastructure (AMI) network. In one aspect, the device 106 is a smart meter. In one aspect, the device 106 is an EVCS. In one aspect, the wireless network 202 comprises one or more of a WPAN (e.g., ZigBee, Bluetooth), LAN/WLAN (e.g., 802.11, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, OpenHAN, power line carrier (PLC), broadband over power lines (BPL), and the like.

The computing device 108 receives, from a second device 206 via a second network 208, configuration information for the first device 106 for configuring the first device 106 to connect to a wireless network 202 through one of the one or more wireless access points 210. In one aspect, the second device 206 comprises part of the wireless network 202. In one aspect, the second device 206 comprises a computer. In one aspect, the second network 208 comprises the Internet. In one aspect, the configuration information comprises a service set identifier (SSID) number and password for the first device 106 for configuring the first device 106 to connect to the wireless network 202.

The device 106 is configured to access the wireless network 202 using at least part of the configuration information. In one aspect, configuring the first device 106 using the configuration information comprises sending at least a portion of the configuration information to the first device 106 via the first network 110. In one aspect, once the device 106 is configured to access the wireless network, it provides an IP address to the computing device 108 over the first network 110 such that at least one of the one or more smart devices 204 and the second device 206 can communicate with the first device 106 via the wireless network 202.

Figure 3:
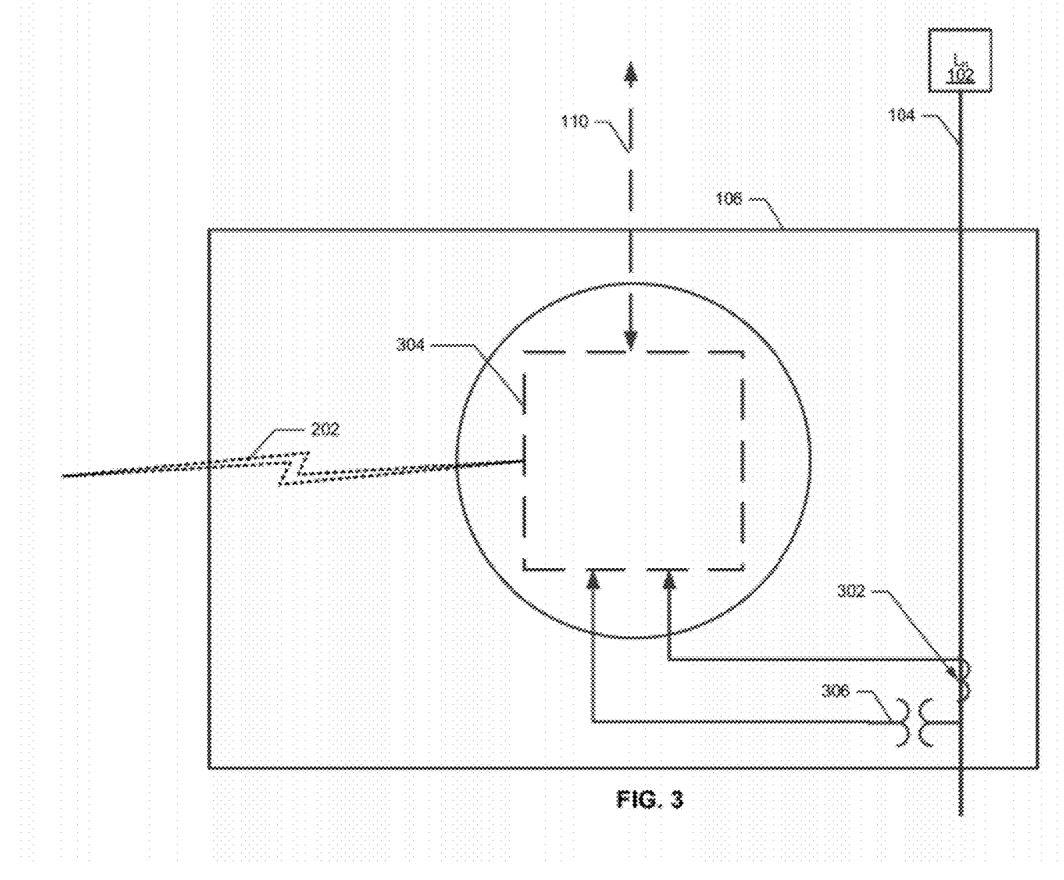
FIG. 3 illustrates an embodiment of a device such as a smart meter or EVCS that can be configured to communicate with smart appliances and other devices over a wireless network, wherein the configuration information is received via a first network from a computing device, and the computing device receives at least a portion of the configuration information via a second network from a second device.

FIG. 3 illustrates an embodiment of a device 106 such as a smart meter that can be configured to communicate with smart appliances and other devices 204 over a wireless network 202, wherein the configuration information is received via a first network 110 from a computing device 108, and the computing device 108 receives at least a portion of the configuration information via a second network 208 from a second device 206. In one aspect, the device 106 is a smart meter and meter electronics 304 enable the smart meter to communicate with the smart devices 204 and the first computing device 108. In another aspect the device 106 is an EVCS with similar electronics as the meter electronics 304. In one aspect, the meter electronics 304 of the device 106 detect the presence of an active wireless network 202 and its wireless access point 210. This information is passed to the computing device 108 via the first network 110, which, in one aspect, can be an AMI network. The computing device 108 receives configuration information for the device 106 from a second device 206, which is used at least in part to configure the device 106 to connect to the wireless network 202. In one aspect, the configuration information includes an SSID and a password for the wireless network 202. In one aspect, the second device 206 comprises part of the wireless network 202. Once the device 106 is connected to the wireless network 202, it is assigned an IP address. This information can be passed from the device 106 to the computing device 108. It can then be used by the second device 206 or other computers or devices 204 to pass information to or receive information from the device 106. The meter electronics 304 are configured to transmit via the first network 110, at least a portion of the information identifying the wireless network 202 and its access point 210 to a computing device 108 connected to the first network 110. The information identifying the wireless network 202 and its access point 210 can comprise an SSID, security protocols, a password and the like. Similarly, the meter electronics 304 can receive configuration information for the device that enables the device 106 to connect to the wireless network 202. The meter electronics 304 can also transmit an IP address assigned by the wireless network 202 (once connected) to the computing device 108. Further comprising the device 106, if it is a smart meter, are one or more current transformers (CTs) 302 and one or more potential transformers (PTs) 306 as may be required for metering, monitoring and power for the smart meter. Similarly, an EVCS can have electronics configured to perform similar functions as described above.

Figure 4:
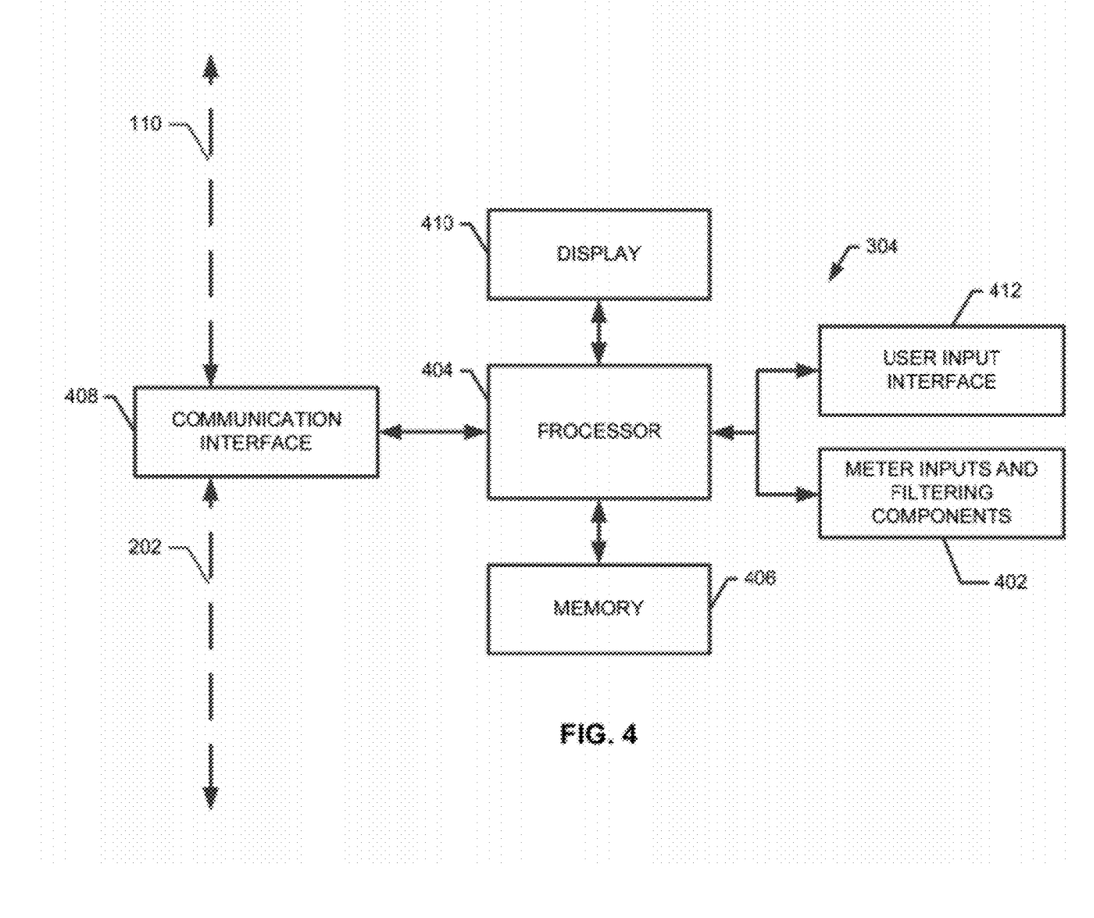
FIG. 4 illustrates a block diagram of an entity capable of operating as meter electronics or EVCS electronics in accordance with one embodiment of the present invention.

Referring now to FIG. 4, a block diagram of an entity capable of operating as meter electronics 304 or EVCS electronics is shown in accordance with one embodiment of the present invention. In one aspect, a meter having meter electronics 304 as shown in FIG. 4 comprises a smart meter. The entity capable of operating as meter electronics 304 or EVCS electronics includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as meter electronics 304 or EVCS electronics can generally include means, such as one or more processors 404 for performing or controlling the various functions of the entity. As shown in FIG. 4, in one embodiment, meter electronics 304 or EVCS electronics can comprise meter inputs and filtering components 402. In one aspect, the meter inputs and filtering components 402 can comprise, for example, voltage and current inputs, one or more ADCs, and filtering components. Further comprising this embodiment of meter electronics 304 is one or more processors 404 and memory 406. In one embodiment, the one or more processors 404 are in communication with or include memory 406, such as volatile and/or non-volatile memory that stores content, data or the like. For example, the memory 406 may store content transmitted from, and/or received by, the entity. For example, the memory may store registration, diagnostic and status information as received from a device 204. Similarly, the memory 406 may store update information as it is being transmitted to the devices 204. Also, for example, the memory 406 may store software applications, instructions or the like for the one or more processors 404 to perform steps associated with operation of the entity in accordance with embodiments of the present invention. In particular, the one or more processors 404 may be configured to perform the processes discussed in more detail herein for configuring the device 106 to access a wireless network, updating software or firmware of a device 204 or reporting diagnostic information. For example, according to one embodiment, the one or more processors 404 can be configured to detect the presence of a wireless network and transmit via the first network 110, information about the detected wireless network to a computing device 108 connected to the first network 110. Similarly, the one or more processors 404 can receive configuration information from the computing device 108 via the first network 110, which can be used to configure the device 106 to join the wireless network. In one aspect, the one or more processors 404 are further configured to transmit, via the first network 110, an IP address for the device to the computing device 108.

In addition to the memory 406, the one or more processors 404 can also be connected to at least one interface or other means for displaying, transmitting and/or receiving data, content or the like. In this regard, the interface(s) can include at least one communication interface 408 or other means for transmitting and/or receiving data, content or the like, as well as at least one user interface that can include a display 410 and/or a user input interface 412. In one aspect, the communication interface 408 can be used to detect the presence of a wireless network and transmit via the first network 110, information about the detected wireless network to a computing device 108 connected to the first network 110. Similarly, the communication interface 408 can be used to receive configuration information from the computing device 108 via the first network 110, which can be used to configure the device 106 to join the wireless network. In one aspect, the communication interface 408 can be used to transmit, via the first network 110, an IP address for the device to the computing device 108. Furthermore, the communication interface 408 can be used to receive update information from the second computing device 108 via the second network 110, and to transfer the update information to the device 204 via the wireless network 202. The user input interface 412, in turn, can comprise any of a number of devices allowing the entity to receive data from a user, such as a keypad, a touch display, a joystick or other input device.

Figure 5:
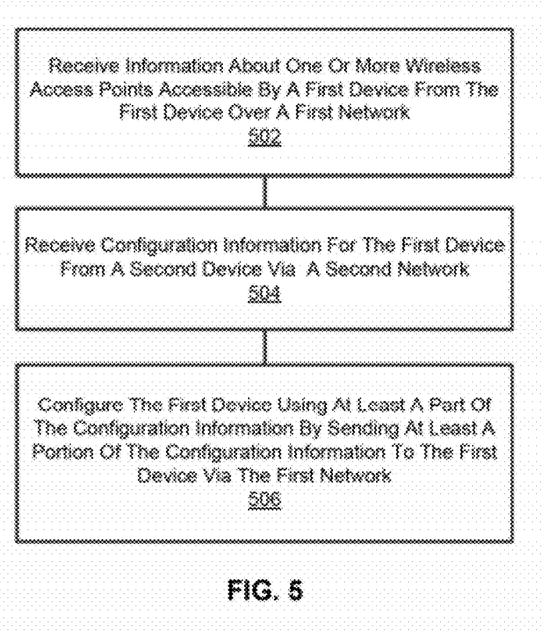
FIG. 5 is a flowchart illustrating the operations that may be taken for configuring a wireless-enabled device over an AMI.

Referring now to FIG. 5, the operations are illustrated that may be taken for configuring a wireless-enabled device over an AMI. At step 502, information about one or more wireless access points accessible by a first device is received from the first device over a first network. In one aspect, receiving, from a first device via a first network, information about one or more wireless access points accessible by the first device comprises receiving from the first device, information about one or more wireless access points accessible by the first device via an advanced metering infrastructure (AMI) network. In one aspect, receiving, from a first device via a first network, information about one or more wireless access points accessible by the first device comprises receiving from a smart meter via the first network, information about one or more wireless access points accessible by the smart meter. In one aspect, receiving, from a first device via a first network, information about one or more wireless access points accessible by the first device comprises receiving from a smart meter, information about one or more wireless access points accessible by the smart meter via an advanced metering infrastructure (AMI) network. In one aspect, receiving, from a first device via a first network, information about one or more wireless access points accessible by the first device comprises receiving from a charging station for an electric vehicle (EV) via the first network, information about one or more wireless access points accessible by the charging station. In one aspect, receiving, from a first device via a first network, information about one or more wireless access points accessible by the first device comprises receiving a charging station for an electric vehicle (EV) via the first network, and information about one or more wireless access points accessible by the smart meter via an advanced metering infrastructure (AMI) network.

At step 504, configuration information for the first device is received from a second device via a second network. The configuration information is for configuring the first device to connect to a wireless network through one of the one or more wireless access points. In one aspect, receiving, from a second device via a second network, configuration information for the first device for configuring the first device to connect to a wireless network through one of the one or more wireless access points comprises receiving the configuration information for the first device for configuring the first device to connect to a wireless network through one of the one or more wireless access points from a computer via the Internet. In one aspect, receiving, from a second device via a second network, configuration information for the first device for configuring the first device to connect to a wireless network through one of the one or more wireless access points comprises receiving the configuration information for the first device for configuring the first device to connect to a wireless local area network (WLAN). In one aspect, receiving the configuration information for the first device for configuring the first device to connect to a wireless local area network (WLAN) comprises receiving configuration information for the first device for configuring the first device to connect to a WLAN that is based on a set of wireless networking standards under IEEE 802.11 (e.g., 802.11a, 802.11b, 802.11g, 802.11-2007, 802.11n and any future-developed similar standards, which will be referred to herein cumulatively as "802.11"). In one aspect, receiving, from a second device via a second network, configuration information for the first device for configuring the first device to connect to a wireless network through one of the one or more wireless access points comprises receiving at least a service set identifier (SSID) number and password for the first device for configuring the first device to connect to a wireless network. In one aspect, receiving, from a second device via a second network, configuration information for the first device for configuring the first device to connect to a wireless network through one of the one or more wireless access points comprises receiving the configuration information for a smart meter for configuring the smart meter to connect to a wireless local area network (WLAN) through one of the one or more wireless access points from a computer via the Internet. In one aspect, receiving, from a second device via a second network, configuration information for the first device for configuring the first device to connect to a wireless network through one of the one or more wireless access points comprises receiving the configuration information for an electric vehicle charging station for configuring the charging station to connect to a wireless local area network (WLAN) through one of the one or more wireless access points from a computer via the Internet.

At step 506, the first device is configured using at least a part of the configuration information. In one aspect, configuring includes sending at least a portion of the configuration information to the first device via the first network. In one aspect, configuring said first device using said configuration information includes sending at least a portion of the configuration information to the first device via the first network comprises sending at least a portion of the configuration information to the first device via an advanced metering infrastructure (AMI) network. In one aspect, the first device includes one of a smart meter or an electric vehicle charging station. In one aspect, the method further compromises receiving from the first device via the first network an IP address for the first device such that at least the second device can communicate with the first device via the wireless network.

Figure 6:
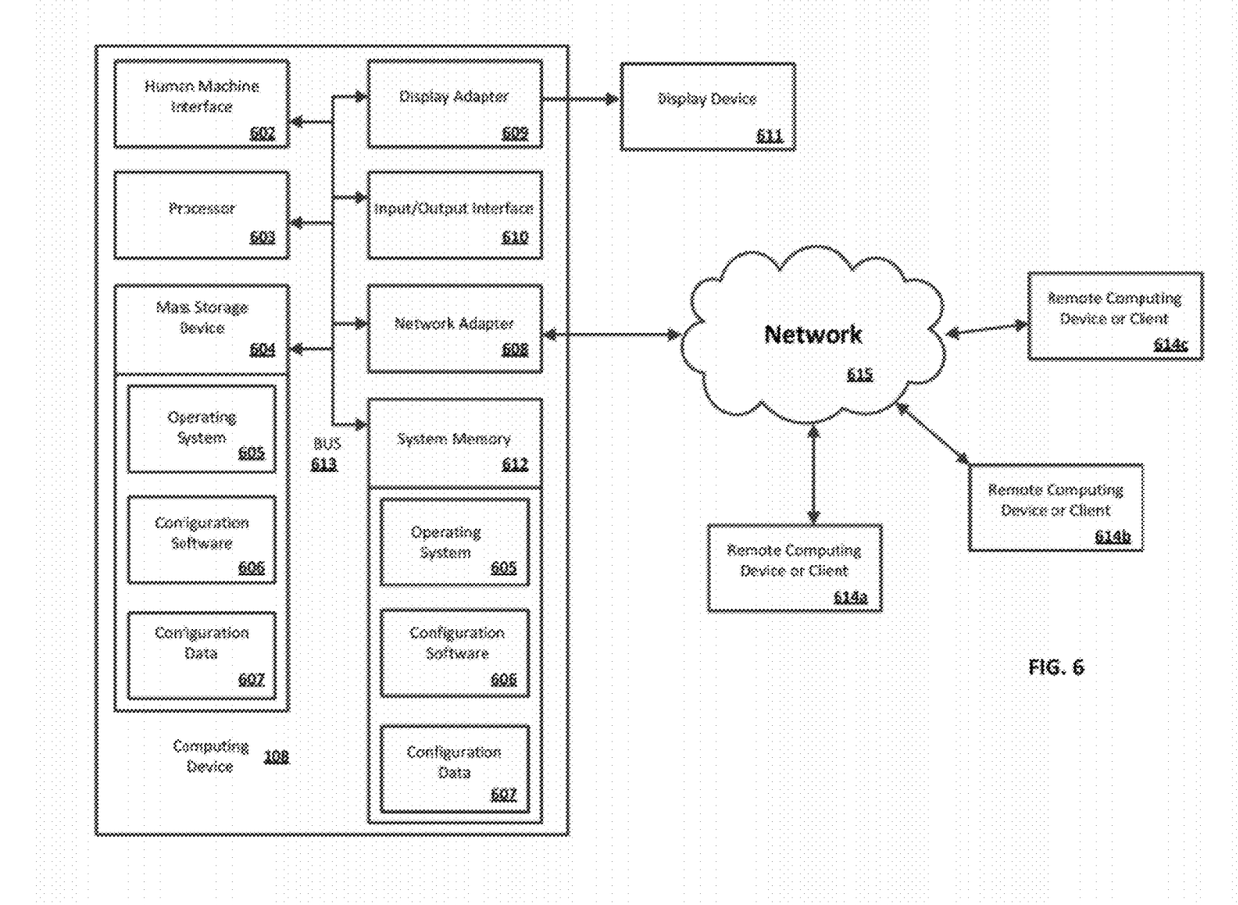
FIG. 6 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit, such as a smart appliance, a smart meter, a smart grid, a utility computing device, a vendor or manufacturer's computing device, etc., can be software, hardware, or a combination of software and hardware. The units can comprise the configuration software 606 as illustrated in FIG. 6 and described below. In one exemplary aspect, the units can comprise a computing device 108 as illustrated in FIG. 6 and described below.

FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 108. The components of the computing device 108 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnect (PCI), a PCI-Express bus, a Personal Computer Memory Card Industry Association (PCMCIA), a Universal Serial Bus (USB) and the like. The bus 613, and all buses specified in this description, can also be implemented over a wired or wireless network connection and each of the subsystems, including the processor 603, a mass storage device 604, an operating system 605, configuration software 606, configuration data 607, a network adapter 608, a system memory 612, an Input/Output Interface 610, a display adapter 609, a display device 611, and a human machine interface 602, can be contained within one or more remote computing devices or clients 614*a,b,c* at physically separate locations, connected through buses of this form, in effect implementing a fully distributed system or distributed architecture.

The computing device 108 typically comprises a variety of computer readable media. Exemplary readable media can be any available media that is non-transitory and accessible by the computing device 108 and comprises, for example and not meant to be limiting, both volatile and non-volatile media and/or removable and non-removable media. The system memory 612 comprises computer readable media in the form of volatile memory, such as random access memory (RAM), and/or non-volatile memory, such as read only memory (ROM). The system memory 612 typically contains data such as configuration data 607 and/or program modules such as operating system 605 and configuration software 606 that are immediately accessible to and/or are presently operated on by the processing unit 603.

In another aspect, the computing device 108 can also comprise other non-transitory, removable/non-removable, volatile/non-volatile computer storage media. By way of example, FIG. 6 illustrates a mass storage device 604 that can provide non-volatile storage of computer code, computer readable instructions, data structures, program modules, and other data for the computing device 108. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and configuration software 606. Each of the operating system 605 and configuration software 606 (or some combination thereof) can comprise elements of the programming and the configuration software 606. Configuration data 607 can also be stored on the mass storage device 604. Configuration data 607 can be stored in any of one or more databases known in the art. Examples of such databases comprise DB2®, (IBM Corporation, Armonk, N.Y.), Microsoft® Access, Microsoft® SQL Server, Oracle® (Microsoft Corporation, Bellevue, Wash.), mySQL, PostgreSQL, and the like. The databases can be centralized or distributed across multiple systems.

In another aspect, the user can enter commands and information into the computing device 108 via an input device (not shown). Examples of such input devices comprise, but are not limited to, a keyboard, a pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, a game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computing device 108 can have more than one display adapter 609 and the computing device 108 can have more than one display device 611. For example, a display device can be a monitor, an LCD (Liquid Crystal Display), or a projector. In addition to the display device 611, other output peripheral devices can comprise components such as speakers (not shown) and a printer (not shown), which can be connected to the computing device 108 via Input/Output Interface 610. Any step and/or result of the methods can be output in any form to an output device. Such output can be any form of visual representation, including, but not limited to, textual, graphical, animation, audio, tactile, and the like.

The computing device 108 can operate in a networked environment using logical connections to one or more remote computing devices or clients 614a,b,c. By way of example, a remote computing device 614 can be a personal computer, a portable computer, a server, a router, a network computer, a smart meter, a vendor or manufacturer's computing device, smart grid components, a peer device or other common network node, and so on. Logical connections between the computing device 108 and a remote computing device or client 614a,b,c can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and other networks 615 such as the Internet.

For purposes of illustration, application programs and other executable program components such as the operating system 605 are illustrated herein as discrete blocks, although it is recognized that such programs and components reside at various times in different storage components of the computing device 108, and are executed by the data processor(s) of the computer. An implementation of configuration software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 404 discussed above with reference to FIG. 4, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 404 of FIG. 4) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and/or the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving, from a first device via a first network, information about one or more wireless access points accessible by the first device;
    receiving, from a second device via a second network, configuration information for the first device for configuring the first device to connect to a wireless network through one of the one or more wireless access points, wherein at least one third device is used for receiving the information about the one or more wireless access points from the first device and the configuration information from the second device; and
    configuring the first device using the configuration information, wherein the configuring includes sending at least a portion of the configuration information from the at least one third device to the first device via the first network.

2. The method of claim 1, wherein receiving, from the first device via the first network, information about the one or more wireless access points accessible by the first device comprises receiving from the first device, information about the one or more wireless access points accessible by the first device via an advanced metering infrastructure (AMI) network.

3. The method of claim 1, wherein receiving, from the first device via the first network, information about the one or more wireless access points accessible by the first device comprises receiving from a smart meter via the first network, information about the one or more wireless access points accessible by the smart meter.

4. The method of claim 3, wherein the smart meter comprises metering, communication and processing technology.

5. The method of claim 1, wherein receiving, from the first device via the first network, information about the one or more wireless access points accessible by the first device comprises receiving from a smart meter, information about the one or more wireless access points accessible by the smart meter via an advanced metering infrastructure (AMI) network.

6. The method of claim 1, wherein receiving, from the first device via the first network, information about the one or more wireless access points accessible by the first device comprises receiving from a charging station for an electric or hybrid electric vehicle (EV) via the first network, information about the one or more wireless access points accessible by the charging station.

7. The method of claim 1, wherein receiving, from the first device via the first network, information about the one or more wireless access points accessible by the first device comprises receiving from a charging station for an electric or hybrid electric vehicle (EV) via the first network, information about the one or more wireless access points accessible by the smart meter via an advanced metering infrastructure (AMI) network.

8. The method of claim 1, wherein receiving, from the second device via the second network, the configuration information for the first device for configuring the first device to connect to the wireless network through the one of the one or more wireless access points comprises receiving the configuration information for the first device for configuring the first device to connect to the wireless network through the one of the one or more wireless access points from a computer via the Internet.

9. The method of claim 1, wherein receiving, from the second device via the second network, the configuration information for the first device for configuring the first device to connect to the wireless network through the one of the one or more wireless access points comprises receiving the configuration information for the first device for configuring the first device to connect to a wireless local area network (WLAN).

10. The method of claim 9, wherein receiving the configuration information for the first device for configuring the first device to connect to the wireless local area network (WLAN) comprises receiving the configuration information for the first device for configuring the first device to connect to the WLAN that is based on a set of wireless networking standards under IEEE 802.11.

11. The method of claim 9, wherein receiving, from the second device via the second network, the configuration information for the first device for configuring the first device to connect to the wireless network through the one of the one or more wireless access points comprises receiving at least a service set identifier (SSID) number and a password for the first device for configuring the first device to connect to the wireless network.

12. The method of claim 1, wherein receiving, from the second device via the second network, the configuration information for the first device for configuring the first device to connect to the wireless network through the one of the one or more wireless access points comprises receiving the configuration information for a smart meter for configuring the smart meter to connect to a wireless local area network (WLAN) through the one of the one or more wireless access points from a computer via the Internet.

13. The method of claim 1, wherein receiving, from the second device via the second network, the configuration information for the first device for configuring the first device to connect to the wireless network through the one of the one or more wireless access points comprises receiving the configuration information for an electric vehicle charging station for configuring the charging station to connect to a wireless local area network (WLAN) through the one of the one or more wireless access points from a computer via the Internet.

14. The method of claim 1, wherein configuring the first device using the configuration information includes sending the at least the portion of the configuration information to the first device via an advanced metering infrastructure (AMI) network.

15. The method of claim 14, wherein the first device includes one of a smart meter or an electric vehicle charging station.

16. The method of claim 1, further comprising receiving from the first device via the first network an IP address for the first device such that at least the second device can communicate with the first device via the wireless network.

17. A system comprised of:
a computing device, comprising: a memory; and a processor operably connected with the memory, the processor configured to:
receive, from a first device via a first network, information about one or more wireless access points accessible by the first device;
receive, from a second device via a second network, configuration information for the first device for configuring the first device to connect to a wireless network through one of the one or more wireless access points; and
configure the first device using the configuration information, wherein the configuring includes sending at least a portion of the configuration information from the computing device to the first device via the first network.

18. The system of claim 17, wherein the first network comprises an advanced metering infrastructure (AMI) network.

19. The system of claim 17, wherein the first device comprises one of a smart meter or a charging station for an electric or hybrid electric vehicle (EV).

20. The system of claim 19, wherein the smart meter comprises metering, communication and processing technology.

21. The system of claim 17, wherein the second network comprises an Internet connection.

22. The system of claim 17, wherein the second device comprises a computer.

23. The system of claim 17, wherein the wireless network comprises a wireless local area network (WLAN).

24. The system of claim 23, wherein the configuration information for the first device for configuring the first device comprises at least a service set identifier (SSID) number and a password for the first device for configuring the first device to connect to the wireless network.

25. The system of claim 17, wherein the first device comprises a smart meter and the smart meter is configured to connect to a wireless local area network (WLAN) through one of the one or more wireless access points from a computer via the Internet.

26. The system of claim 17, wherein the first device comprises a charging station for an electric or hybrid electric vehicle (EV) and the charging station is configured to connect to a wireless local area network (WLAN) through one of the one or more wireless access points from a computer via the Internet.

27. The system of claim 17, wherein the processor is further configured to receive from the first device via the first network an IP address for the first device such that at least the second device can communicate with the first device via the wireless network.

28. A device comprised of:
a memory;
a wireless network interface;
a first network interface;
a processor operably connected with the memory, the first network interface, and a second network interface, wherein the processor is configured to:
detect, using the wireless network interface, the presence of an active wireless network;
transmit, using the first network interface, information about the wireless network to a computing device over a first network; and
receive, using the first network interface, configuration information from the computing device via the first network, wherein at least a first portion of the configuration information is transmitted to the computing device from a second device via a second network and at least a second portion of the configuration information is stored in the memory.

29. The device of claim 28, wherein the processor is further configured to:
connect, using the wireless network interface, to the active wireless network using at least a third portion of the configuration information;
receive, using the wireless network interface, from the wireless network, an IP address assigned to the device and storing the IP address in the memory; and transmit, using the first network interface, the IP address to the computing device via the first network.

30. The device of claim 28, wherein the first network comprises an advanced metering infrastructure (AMI) network.

31. The device of claim 28, wherein the device comprises one of a smart meter or a charging station for an electric or hybrid electric vehicle (EV).

32. The device of claim 28, wherein the second network comprises an Internet connection.

33. The device of claim 28, wherein the second device comprises a computer.

34. The device of claim 28, wherein the wireless network comprises a wireless local area network (WLAN).

35. The device of claim 28, wherein the configuration information comprises at least a service set identifier (SSID) number and a password for the device for configuring the device to connect to the wireless network.

* * * * *

UNITED STATES PATENT AND TRADEMARK OFFICE
CERTIFICATE OF CORRECTION

| | | |
|---|---|---|
| PATENT NO. | : 9,019,864 B2 | Page 1 of 1 |
| APPLICATION NO. | : 13/026825 | |
| DATED | : April 28, 2015 | |
| INVENTOR(S) | : Ree et al. | |

It is certified that error appears in the above-identified patent and that said Letters Patent is hereby corrected as shown below:

In the Specification

In Column 2, Line 16, delete "utilities" and insert -- utilities: --, therefor.

In Column 5, Line 25, delete "disclosed" and insert -- disclosed, --, therefor.

Signed and Sealed this
Fifth Day of April, 2016

Michelle K. Lee
*Director of the United States Patent and Trademark Office*